United States Patent Office 3,553,169
Patented Jan. 5, 1971

3,553,169
NEW DIALDEHYDE-KETONE POLYCONDENSATES
Jean-Pierre Quentin, Lyon, and Michel Ruaud, Isere, France, assignors to Rhone-Poulenc S.A., Paris, France, a French body corporate
No Drawing. Filed Apr. 15, 1968, Ser. No. 721,149
Claims priority, application France, Apr. 28, 1967, 104,626; Feb. 14, 1968, 139,880
Int. Cl. C08g 3/00
U.S. Cl. 260—64
6 Claims

ABSTRACT OF THE DISCLOSURE

The invention provides (a) novel polycondensates consisting of units of formulae:

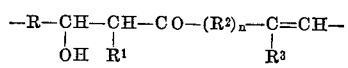

and

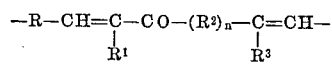

where R is a divalent aromatic radical, $n$ is 0 or 1, R is

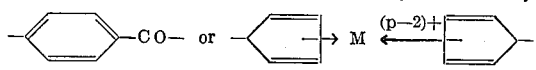

where M is a transition metal having a degree of oxidation $p$, and $R^1$ and $R^3$ are each hydrogen, an aliphatic or cycloaliphatic radical, or, when $n$ is 0, together form a polymethylene chain; (b) a process for making such polycondensates by interfacial polymerization in the presence of a base of a dialdehyde of formula:

OHC—R—CHO and a ketone of formula:

and (c) polymerizable compositions comprising the new polycondensates and a copolymerizable olefinic monomer.

---

The present invention relates to polycondensates of dialdehydes and ketones, their preparation, and compositions containing them.

In French Pat. No. 1,268,008, it has been proposed to prepare polycondensates containing a plurality of units of formula:

linked together especially by p-phenylene radicals, by heating a dialdehyde such as terephthaldehyde with acetone in solution in a solvent, in the presence of an alkaline base. The polymers obtained are crosslinkable on exposure to light to give products which are insoluble in solvents for the non-crosslinked polymer. This sensitivity to light requires that the polycondensates should be handled and stored away from any source of ultra-violet rays.

Lebsadze et al. (Soobsch. Akad. Nauk. Grouz. S.S.R., 39, 75 to 79 (1965)) have also proposed to react terephthaldehyde with acetone at ambient temperature in 10% sodium hydroxide solution. The polycondensate obtained, after washing with hot benzene and with acetone, is dried in vacuo at 100–120° C. The yellow powder obtained is infusible and insoluble in the usual organic solvents. This polymer has a degree of polycondensation in the neighbourhood of 2.

The present invention provides new polycondensates which are soluble in organic solvents, fusible and non-crosslinkable on exposure to light, and which have a chain comprising a plurality of identical or different units of the formulae:

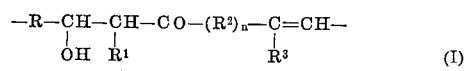

and

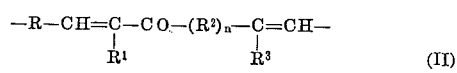

in which R is unsubstituted or halogen-substituted m-phenylene, p-phenylene or p-diphenylene, $n$ is 0 or 1, $R^2$ is a radical of the formula:

wherein M is a transition metal having a degree of oxidation $p$, and $R^1$ and $R^3$ are each hydrogen or an aliphatic or cycloaliphatic radical, or, when $n=0$, are linked together to form a polymethylene chain.

These new polycondensates are obtained by the reaction of a dialdehyde of the formula OHC—R—CHO with a ketone of the formula:

$$R^1—CH_2—CO(R^2)_n—CH_2R^3$$

(wherein the various symbols are as defined above) in the presence of a base and in solution in a mixture of substantially immiscible solvents such that no one solvent dissolves all three of the said dialdehyde, ketone or base.

Suitable dialdehydes are terephthaldehyde, 2,5-dichloroterephthaldehyde, isophthaldehyde and bis-(p-formyl)diphenylene.

In the ketones, $R^1$ and $R^3$ are preferably alkyl radicals of 1 to 4 carbon atoms or cycloalkyl radicals of 5 to 12 ring carbon atoms, or they may represent together a polymethylene chain having from 2 to 9 carbon atoms. When $R^2$ represents a radical of formula:

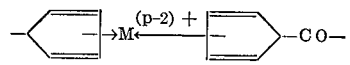

M may represent a metal such as iron, vanadium, nickel, cobalt, ruthenium, manganese or titanium, especially the first.

Suitable ketones include, more particularly, acetone, butanone, pentan-2-one, pentan-3-one, cyclopentanone, cyclohexanone, p-diacetylbenzene and 1,1′-diacetylferrocene.

The solvents employed in carrying out the process of preparation must conform to the usual criteria of solvents employed in interfacial polycondensation. They must be immiscible or substantially immiscible with one another. Each must be a substantial non-solvent for one of the reactants present, or must in relation to one of the others have a partition coefficient which is very high (or very low) in relation to one of the reactants. Water is a suitable solvent for acetone and is a non-solvent for the dialdehydes. In general, the dialdehyde may be dissolved in an aromatic hydrocarbon such as benzene, toluene, xylenes or naphthalene, or in diethyl ether.

The reaction temperature may vary between 5° and 100° C. and is preferably between 15° and 60° C.

The dialdehyde and the ketone are employed in substantially equimolecular quantities, but the operation may be carried out without disadvantage in the presence of an excess of either of the reactants.

The concentration of the reactants in each of the solvents may vary within wide limits without affecting the reaction.

The base used as catalyst for the reaction may be an alkali metal base such as sodium or potassium hydroxide, or an organic base such as a tertiary amine (triethylamine, tributylamine or triethanolamine), a heterocyclic base such as pyridine, or a quaternary ammonium hydroxide.

The polycondensates produce in accordance with the invention are distinguished from the polymers previously prepared by their stability to light ad their solubility in organic solvents Consequently, they are easy to shape. They form readily handable powders which, on heating to temperatures above 100° C., are converted into insoluble and infusible products containing units of the formula:

$$-R-CH=C-CO-(R^2)_n C=CH-$$
$$\phantom{-R-CH=}\overset{|}{R^1}\phantom{-CO-(R^2)_n}\overset{|}{R^3}\qquad (II)$$

which have electrical semiconductor properties The polymers according to the invention may therefore be employed for example as solutions for the production of semiconductor films For this purpose they may be employed alone or in association with organic compounds comprising one or more ethylenic double bonds such as styrene divinylbenzene diallyl phthalate triallyl cyanurate, divinyl adipate, the vinylsiloxanes, and the polyvinylsiloxanes such as 1,3,5,7 - tetravinyl - 1,3,5,7 - tetramethyl-cyclotetrasiloxane.

In the use of compounds having an ethylenic double bond, crosslinking may be effected by subjecting the composition obtained to the action of heat in the presence of an agent generating free radicals, such as a peroxide, a hydroperoxide, an oxazirane or an azo compound (e.g. azobisisobutyronitrile).

The following examples illustrate the invention.

EXAMPLE 1

Into a 200 cc. round-bottom glass flask 1.16 g. of acetone (0.2 mol.), 5 g. of caustic soda and 50 cc. of water are introduced. A solution of 2.68 g. of tetephthaldehyde (0.2 mol.) in 50 cc. of benzene is then added with stirring at a temperature of 26° C. A yellow precipitate rapidly appears. Stirring is continued for 1 hour, and the reaction mixture is then added to 300 g. of melting ice containing 10 cc. of glacial acetic acid. The precipitate obtained is filtered off, washed with 400 cc. of water and then with 300 cc. of acetone, and dried at 50° C. in vacuo for 12 hours. 2.34 g. of a yellow powder which is soluble in dimethylsulphoxide and hexamethylphosphotriamide are obtained. This polycondensate has a reduced viscosity of 15–15 ml./g. measured on a 5 g./l. solution in dimethylsulphoxide at 25° C. Percentage analysis and the infra-red spectrum show that the condensate obtained contains units of the formula:

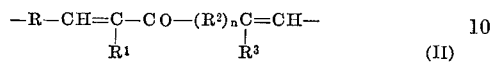

The infra-red spectrum shows an absorption band at 3400 cm.$^{-1}$ corresponding to a hydroxyl group and an absorption band at 1060 cm.$^{-1}$ corresponding to the carbon-oxygen bond of an alcohol function. The molecular weight of the polycondensate is about 2000. Its softening point is between 160° and 180° C. (Maquenne block).

EXAMPLE 2

In order to check the influence of temperature on the progress of the reaction, the procedure of Example 1 was followed, but the temperature was varied. The results set out in the following table were obtained:

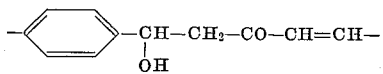

| Temperature in ° C. | Polycondensate obtained in g. | Reduced viscosity in cc./g. |
| --- | --- | --- |
| 6 | 2.41 | 13.5 |
| 25 | 2.40 | 14 |
| 40 | 2.71 | 12 |

EXAMPLE 3

The procedure of Example 1 was followed, but the terephthaldehyde/acetone mole ratio was varied. The following results were obtained:

| Aldehyde/ketone | Weight of polycondensate in g. | Reduced viscosity in cc./g. |
| --- | --- | --- |
| 1.5/1 | 2.73 | 10.6 |
| 1.3/1 | 2.54 | 11.6 |
| 1.1/1 | 2.46 | 15 |
| 1/1.3 | 2.37 | 13.7 |
| 1/1.5 | 2.50 | 10.2 |

EXAMPLE 4

With the aid of a caster, 10 g. of a 10% solution in hexamethylphosphotriamide of the polycondensate obtained in Example 1, which contains in addition 10 mg. of azobisisobutyronitrile, 40 mg. of dicumyl peroxide and 200 mg. of divinyl adipate are spread over a 50 sq. cm. glass plate. The glass plate is then placed in an oven and heated to 60° C. in vacuo for 24 hours and at 120° C. in a ventilated oven for 16 hours. A brownish-black flexible film of a thickness of 0.2 mm. is obtained.

EXAMPLE 5

Into a 100 cc. round-bottomed flask provided with a stirring system and a nitrogen inlet, 30 cc. of dimethyl-sulphoxide, 2.5 g. of polycondensate obtained as in Example 1 and having a reduced viscosity of 14 cc./g., 125 mg. of divinylbenzene and 100 mg. of azobisisobutyronitrile are introduced. The contents of the flask are brought to 60 C. and this temperature is maintained for 18 hours under a moderate superatmospheric nitrogen pressure. The contents of the flask are then cooled and added to 500 cc. of water. The precipitate obtained is filtered off, washed with 500 cc. of hot benzene and then with 800 cc. of acetone and then dried in vacuo at 40° C. for 12 hours. A yellow-ochre powder having a reduced viscosity of 38 cc./g. is obtained.

EXAMPLE 6

To 10 g. of 10% solution of the terephthalic aldehyde/acetone polycondensate in hexamethylphosphotriamide, prepared as in Exampe 1, 10 mg. of dicumyl peroxide and 200 mg. of 1,3,5,7 - tetramethyl-1,3,5,7-tetravinyl-cyclotetrasiloxane are added. The solution is spread on a glass plate and heated at 80° C. for 17 hours in an oven under a vacuum of 100 mm. Hg. and at 120° C. for 22 hours under atmospheric pressure. A film having excellent stability is obtained with a thickness of 0.30 mm. and a surface area of 50 sq. cm.

EXAMPLE 7

50 cc. of 10% aqueous sodium hydroxide are introduced into a 250 cc. round-bottom flask and 4.02 g. of terephthaldehyde (3.03 mol.) and 2.7 g. of 1,1'-diacetylferrocene in solution 50 cc. of benzene are successively added with stirring. The stirring is continued for 5 hours at 25° C. The reaction mixture is poured into 400 cc. of water containing 10 cc. of glacial acetic acid, the mixture is filtered and the precipitate is washed, first with one litre of water and then with one litre of benzene, and dried in vacuo at 40° C. for 15 hours. 2.2 g. of a red powder soluble in dimethylsulphoxide and hexamethylphosphotriamide are obtained. This polycondensate has a reduced viscosity of about 14.5 cc./g. measured on 5 g./l. solution in dimethylsulphoxide at 25° C. Its resistivity is $6 \times 10^8 \Omega$ cm. at 25° C. and $8.66 \times 10^6 \Omega$ cm. at 100° C., which is a resistivity ratio of 70:1 between 25° C. and 100° C. In addition, the polycondensate exhibits the following infra-red absorption bands: 6.03μ bonds; 6.6μ corresponding to aromatic double bond; 3.25 corresponding to C—H bonds of cyclopentadiene nucleus (same absorption band as in diacetylferrocene); 2.90μ corresponding to the radical —OH; and 9.45μ corresponding to the bond —C—O—.

We claim:
1. A polycondensate consisting of units of the formulae:

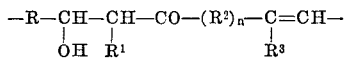

and

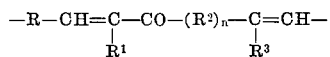

in which R is unsubstituted or halogen-substituted m-phenylene, p-phenylene, or p-diphenylene, $n$ is 0 or 1, $R^2$ is a radical of formula:

wherein M is a transition metal atom selected from the group consisting of iron, vanadium, nickel, cobalt, ruthenium, manganese, and titanium and having a degree of oxidation $p$, and $R^1$ and $R^3$ are each hydrogen, alkyl of 1 to 4 carbon atoms, or cycloalkyl of 5 to 12 ring carbon atoms, or, when $n$ is 0, are linked together to form a polymethylene chain of 2 to 9 carbon atoms.

2. A polycondensate according to claim 1 in which R is p-phenylene, $n$ is 1, $R^2$ is

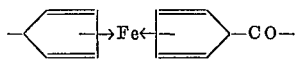

and $R^1$ and $R^3$ are both methyl.

3. A polycondensate according to claim 1 in which R is p-phenylene, $n$ is 0, and $R^1$ and $R^3$ are both hydrogen.

4. Process for the preparation of a polycondensate which comprises reacting, at a temperature of 5° to 100° C., a dialdehyde of the formula:

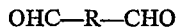

with a ketone of the formula:

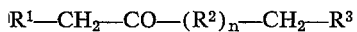

in which R is unsubstituted or halogen-substituted m-phenylene, p-phenylene, or p-diphenylene, $n$ is 0 or 1, $R^2$ is a radical of formula:

wherein M is a transition metal atom selected from the group consisting of iron, vanadium, nickel, cobalt, ruthenium, manganese, and titanium, and having a degree of oxidation $p$, and $R^1$ and $R^3$ are each hydrogen, alkyl of 1 to 4 carbon atoms, or cycloalkyl of 5 to 12 ring carbon atoms, or, when $n$ is 0, are linked together to form a polymethylene chain of 2 to 9 carbon atoms, in the presence of a base selected from the group consisting of alkali metal bases, tertiary amines, and quaternary ammonium hydroxides, and in solution in a mixture of substantially immiscible inert solvents such that no one solvent dissolves all three of the said dialdehyde, ketone and base.

5. Process according to claim 4 in which the reaction is carried out in a mixture of an aromatic hydrocarbon and water.

6. Process according to claim 4 in which the base is an alkali metal hydroxide.

References Cited
UNITED STATES PATENTS 3,375,229   3/1968   Borden et al. _____ 260—50

WILLIAM H. SHORT, Primary Examiner

L. L. LEE, Assistant Examiner

U.S. Cl. X.R.

252—500, 519; 260—30.6, 32.6, 824, 875, 886